(12) United States Patent
Huang

(10) Patent No.: US 7,573,644 B2
(45) Date of Patent: Aug. 11, 2009

(54) LIGHT PIPE ASSEMBLY INCLUDING A PLURALITY OF LENSES AND RELATED PROJECTOR SYSTEM

(75) Inventor: Ching-Shuai Huang, Changhua County (TW)

(73) Assignee: Qisda Corporation, Taoyuan County (TW)

( * ) Notice: Subject to any disclaimer, the term of this patent is extended or adjusted under 35 U.S.C. 154(b) by 0 days.

(21) Appl. No.: 12/164,128

(22) Filed: Jun. 30, 2008

(65) Prior Publication Data

US 2009/0009879 A1    Jan. 8, 2009

(30) Foreign Application Priority Data

Jul. 2, 2007    (TW) .............................. 96123975 A

(51) Int. Cl.
G02B 3/00    (2006.01)

(52) U.S. Cl. ...................... 359/650; 359/618; 359/599; 385/146; 353/31; 353/98; 353/122

(58) Field of Classification Search ................. 359/650, 359/618, 599; 385/146; 353/31, 98, 122
See application file for complete search history.

(56) References Cited

U.S. PATENT DOCUMENTS

| 2005/0046807 A1* | 3/2005 | Hanano ....................... 353/98 |
| 2005/0111818 A1* | 5/2005 | Wang et al. ................. 385/147 |
| 2006/0215265 A1* | 9/2006 | Miyatake et al. ........... 359/494 |

* cited by examiner

*Primary Examiner*—Evelyn A. Lester

(57) ABSTRACT

A light pipe assembly includes a lens set and a holder. The lens set includes a first lens, a second lens, a third lens, and a fourth lens. The first lens has a first surface and a fifth surface adjacent to the first surface. The second lens has a second surface and a sixth surface adjacent to the second surface, and the fifth surface covers the second surface. The third lens has a third surface and a seventh surface adjacent to the third surface, and the sixth surface covers the third surface. The fourth lens has a fourth surface and an eighth surface adjacent to the fourth surface. The seventh surface covers the fourth surface and the eighth surface covers the first surface. Furthermore, the holder is used for encompassing and abutting the lens set.

20 Claims, 7 Drawing Sheets

LIGHT PIPE ASSEMBLY INCLUDING A PLURALITY OF LENSES AND RELATED PROJECTOR SYSTEM

BACKGROUND OF THE INVENTION

1. Field of the Invention

The present invention relates to a light pipe assembly and a related projector system, and more specifically, to a light pipe assembly including a plurality of lenses and a related projector system.

2. Description of the Prior Art

At present, projectors are commonly used during meetings and conferences. Digital light processing projector (DLP) is one of the most representative examples among projectors capable of projecting digital images.

A digital light processing (DLP) projector comprises a light source, a light pipe assembly, a color wheel, a digital micromirror device (DMD), and a projection lens. Light generated by the light source is focused at an entrance of the light pipe assembly by a curved surface reflector and a convex lens installed inside the DLP projector. After being uniformed by the light pipe assembly, the light passes through the color wheel to be filtered into RGB (Red, Green, Blue) light and then is reflected by the digital micromirror device (DMD) to form digital images. Eventually, the digital images projected to a surface by the projection lens.

As mentioned above, the uniformed light matters the performance of DLP projector, and the light pipe assembly is the crucial component. FIG. 1 is a diagram of a light pipe assembly 2 according to the prior art. As shown in FIG. 1, the light pipe assembly 2 is composed of four pieces of lenses 4 glued together by glue 6. However, the light pipe assembly 2 often lies in a high temperature/UV environment since light generated by a light source is always focused at the entrance of the light pipe assembly 2. Therefore, the deterioration of the glue 6 happens all the time due to the high temperature/ultraviolet environment, and causes the collapse of the light pipe assembly 2. The common method to avoid such consequence is using thermostable and anti-ultraviolet glue, but it raises cost of production. How to manufacture a light pipe assembly firmly should be a concern in mechanical design of DLP projector.

SUMMARY OF THE INVENTION

Therefore, the present invention provides a light pipe assembly and related projector system to solve aforementioned problems.

The present invention provides a light pipe assembly composed of a plurality of lenses comprising a lens set comprising a first lens having a first surface and a fifth surface adjacent to the first surface, a first width of the first surface being substantially equal to a first thickness of the first lens; a second lens having a second surface and a sixth surface adjacent to the second surface, a second width of the second surface being substantially equal to a second thickness of the second lens, the fifth surface covering the second surface; a third lens having a third surface and a seventh surface adjacent to the third surface, a third width of the third surface being substantially equal to a third thickness of the third lens, the sixth surface covering the third surface; a fourth lens having a fourth surface and an eighth surface adjacent to the fourth surface, a fourth width of the fourth surface being substantially equal to a fourth thickness of the fourth lens, the seventh surface covering the fourth surface, the eighth surface covering the first surface; and a holder for encompassing and abutting the lens set.

The present invention further provides a projector system having light pipe assembly comprising a light source for generating a light beam; a light pipe assembly for uniforming and guiding the light beam comprising a lens set comprising a first lens having a first surface and a fifth surface adjacent to the first surface, a first width of the first surface being substantially equal to a first thickness of the first lens; a second lens having a second surface and a sixth surface adjacent to the second surface, a second width of the second surface being substantially equal to a second thickness of the second lens, the fifth surface covering the second surface; a third lens having a third surface and a seventh surface adjacent to the third surface, a third width of the third surface being substantially equal to a third thickness of the third lens, the sixth surface covering the third surface; a fourth lens having a fourth surface and an eighth surface adjacent to the fourth surface, a fourth width of the fourth surface being substantially equal to a fourth thickness of the fourth lens, the seventh surface covering the fourth surface, the eighth surface covering the first surface; and a holder for encompassing and abutting the lens set; an imaging device for processing the light beam uniformed by the light pipe assembly to form an image; and a projection lens for receiving the light beam processed by the imaging device and projecting the image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
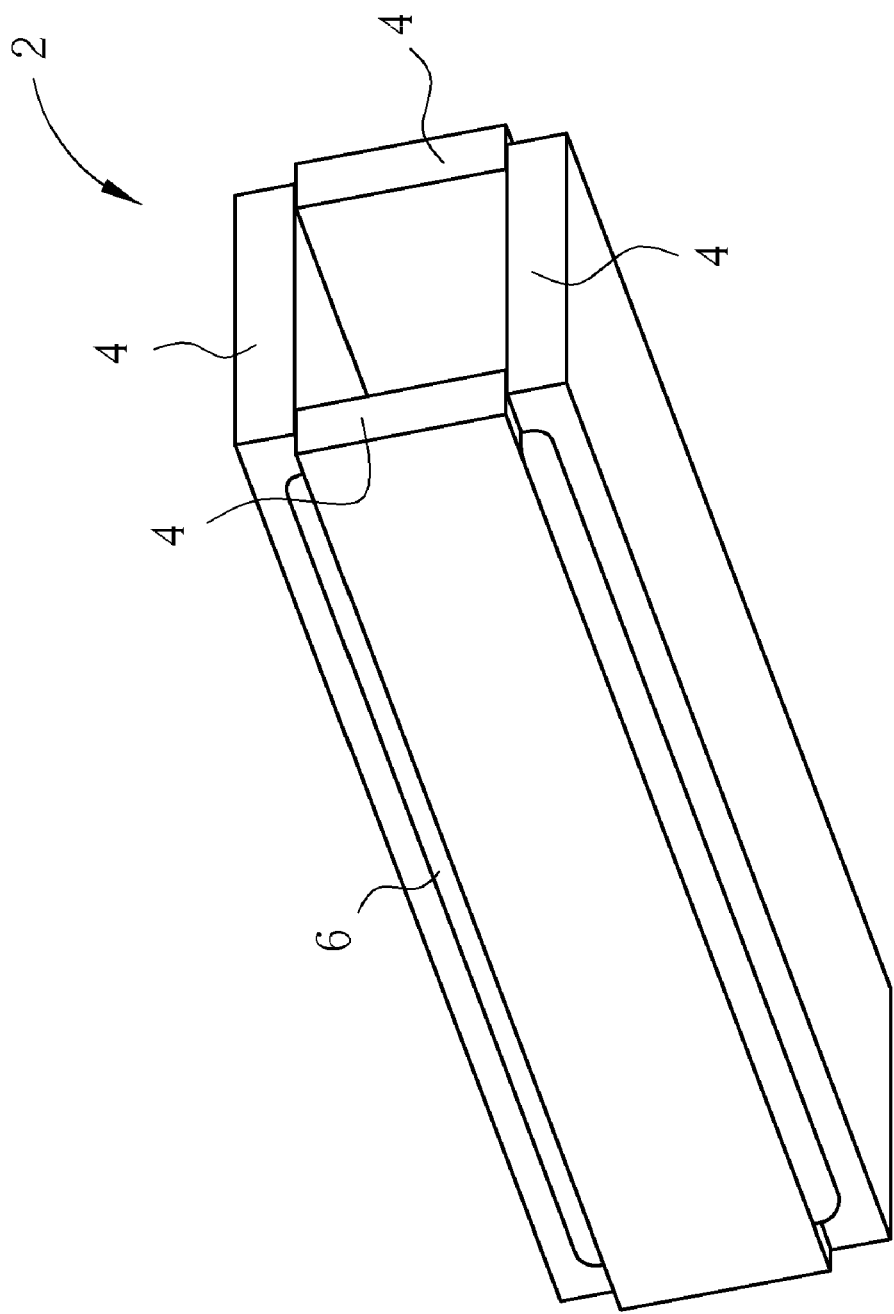
FIG. 1 is a diagram of a light pipe assembly according to the prior art.
Figure 2:
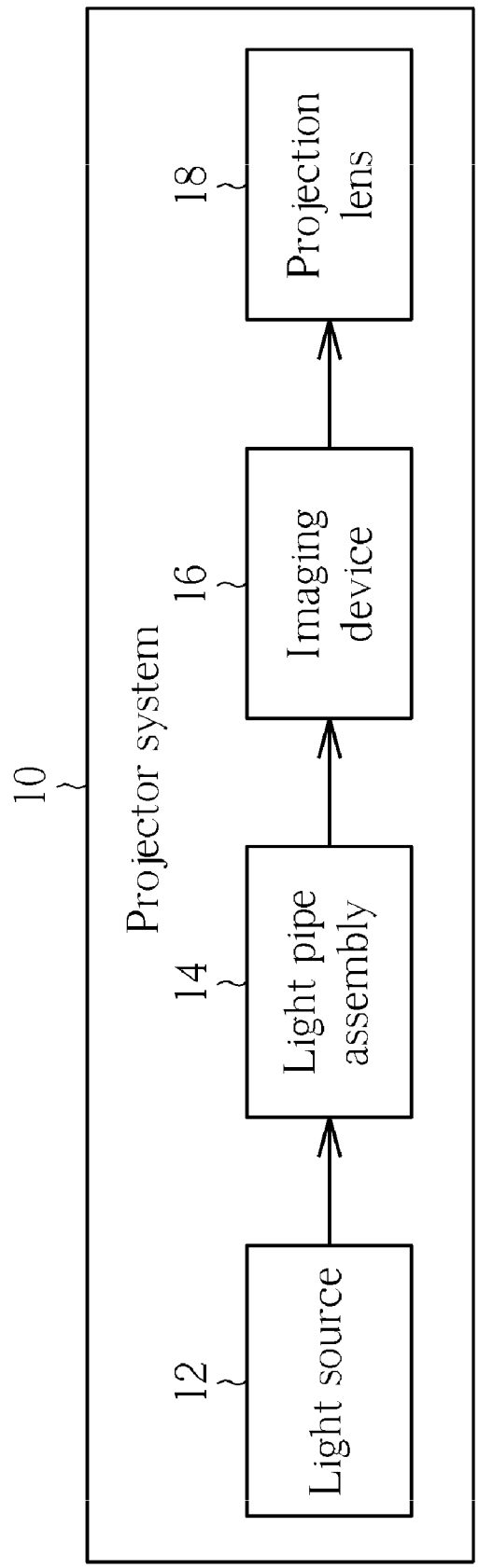
FIG. 2 is a block diagram of a projector system according to the present invention.

Please refer to FIG. 2. FIG. 2 is a block diagram of a projector system 10 according to the present invention. The projector system 10 comprises a light source 12, a light pipe assembly 14, an imaging device 16, and a projection lens 18. The light source 12 is used for generating a light beam. The light pipe assembly 14 is used for uniforming and guiding the light beam generated by the light source 12. The imaging device 16 is used for processing the light beam uniformed by the light pipe assembly 14 to form an image. The projection lens 18 is used for receiving the light beam processed by the imaging device 16 and projecting the image.

Figure 3:
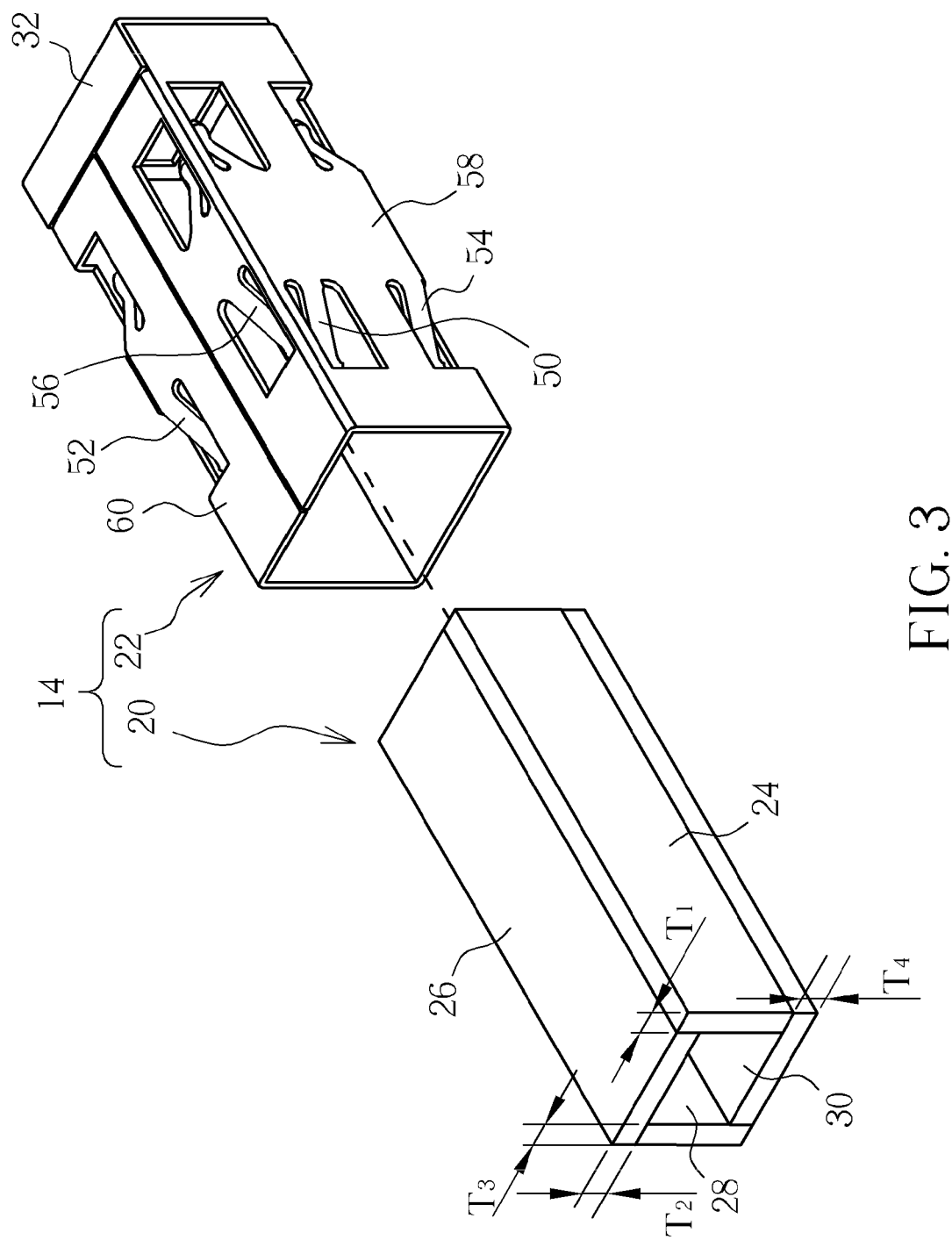
FIG. 3 is an exploded diagram of the light pipe assembly in FIG. 2.

Please refer to FIG. 3. FIG. 3 is an exploded diagram of the light pipe assembly 14 in FIG. 2. The light pipe assembly 14 comprises a lens set 20 and a holder 22. The lens set 20 comprises a first lens 24, a second lens 26, a third lens 28, and a fourth lens 30. As shown in FIG. 3, the first lens 24, the second lens 26, the third lens 28, and the fourth lens 30 form a rectangular hollow structure together. That is to say, the first lens 24 is parallel to the third lens 28, the second lens 26 is parallel to the fourth lens 30, and the first lens 24 is perpendicular to the second lens 26. The holder 22 is used for encompassing and abutting the lens set 20. Furthermore, the holder 22 has a base 32.

Figure 4:
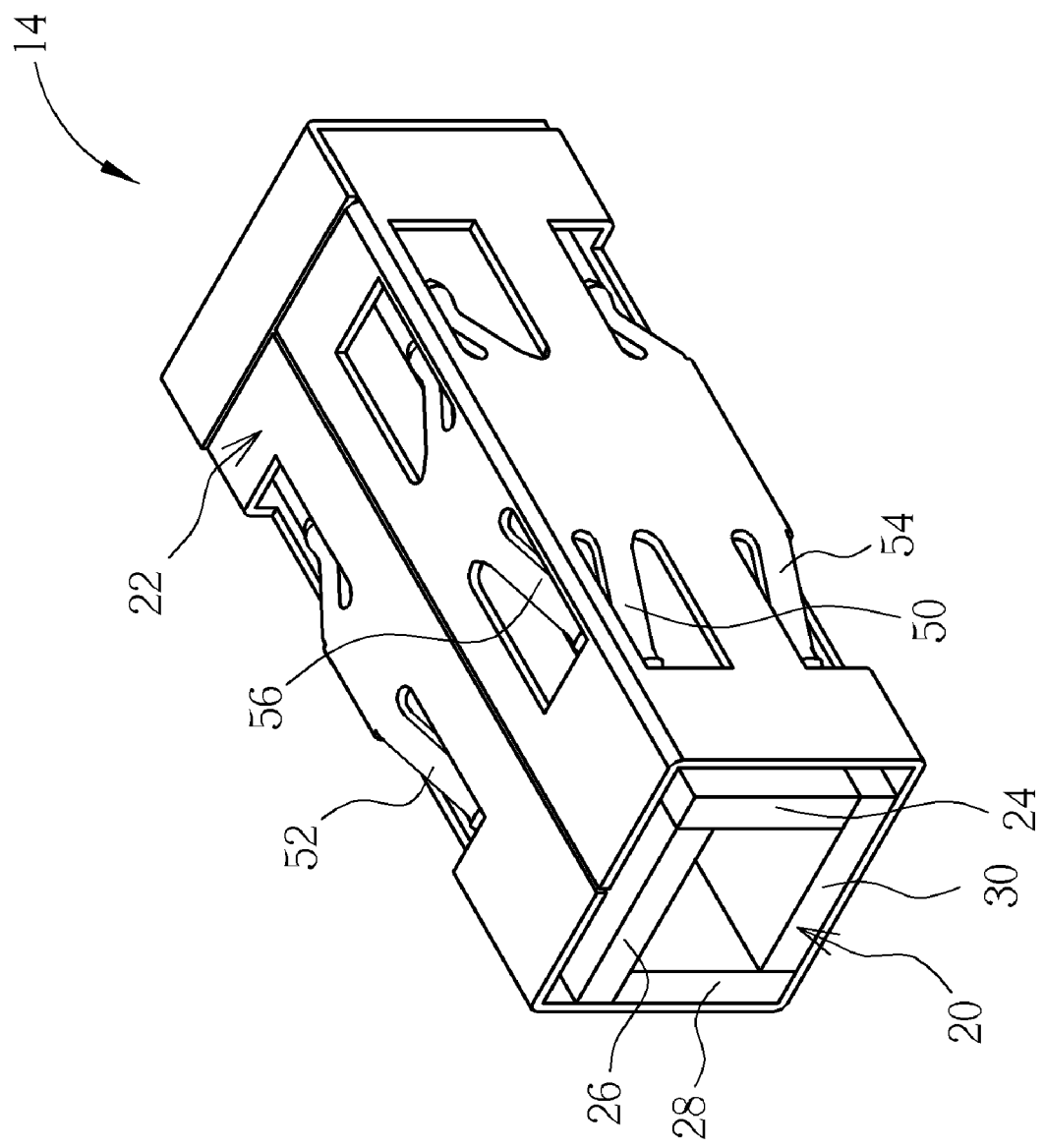
FIG. 4 is an assembly diagram of the light pipe assembly in FIG. 3.

More detailed description for assembly procedure of the light pipe assembly 14 is provided as follows. Please refer to FIG. 3 and FIG. 4. FIG. 4 is an assembly diagram of the light pipe assembly 14 in FIG. 3. First, the first lens 24, the second lens 26, the third lens 28, and the fourth lens 30 are assembled into a rectangular hollow structure as shown in FIG. 3 (i.e. the lens set 20) by an auxiliary tool. Next, the lens set 20 is sheathed by the holder 22. At the same time, the lens set 20 is pushed toward the base 32 of the holder 22 till the lens set 20 leans on the base 32 so as to complete the assembly procedure of the light pipe assembly 14. How to assemble the light pipe assembly 14 is not limited to the aforementioned procedure. For example, the light pipe assembly 14 can be also assembled by means of inserting four pieces of lenses mentioned above into the holder 22 in turn.

Figure 5:
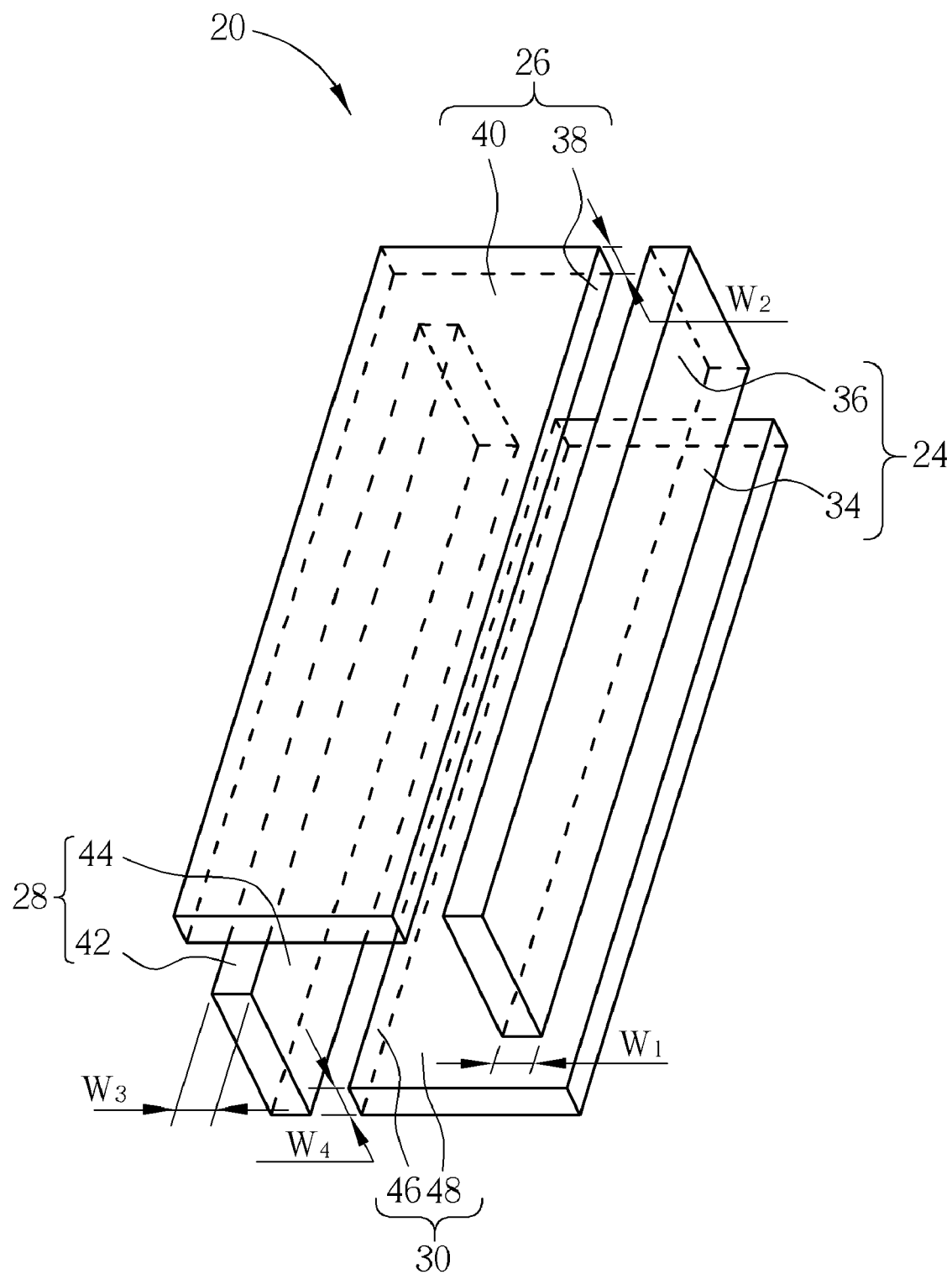
FIG. 5 is an exploded diagram of the lens set in FIG. 3.

Next, more detailed description for the lens set 20 and the holder 22 is provided as follows. Please refer to FIG. 5. FIG. 5 is an exploded diagram of the lens set 20 in FIG. 3. As shown in FIG. 3 and FIG. 5, the first lens 24 has a first surface 34 and a fifth surface 36 adjacent to the first surface 34. The first surface 34 contacts the fourth lens 30, and the fifth surface 36 contacts the second lens 26. A first width $W_1$ of the first surface 34 is substantially equal to a first thickness $T_1$ of the first lens 24 shown in FIG. 3. The second lens 26 has a second surface 38 and a sixth surface 40 adjacent to the second surface 38. The second surface 38 contacts the first lens 24, and the sixth surface 40 contacts the third lens 28. A second width $W_2$ of the second surface 38 is substantially equal to a second thickness $T_2$ of the second lens 26 shown in FIG. 3, and the fifth surface 36 of the first lens 24 covers the second surface 38 of the second lens 26. The third lens 28 has a third surface 42 and a seventh surface 44 adjacent to the third surface 42. The third surface 42 contacts the second lens 26, and the seventh surface 44 contacts the fourth lens 30. A third width $W_3$ of the third surface 42 is substantially equal to a third thickness $T_3$ of the third lens 28 shown in FIG. 3, and the sixth surface 40 of the second lens 26 covers the third surface 42 of the third lens 28. The fourth lens 30 has a fourth surface 46 and an eighth surface 48 adjacent to the fourth surface 46. The fourth surface 46 contacts the third lens 28, and the eighth surface contacts the first lens 24. A fourth width $W_4$ of the fourth surface 46 is substantially equal to a fourth thickness $T_4$ of the fourth lens 30 shown in FIG. 3. The seventh surface 44 of the third lens 28 covers the fourth surface 46 of the fourth lens 30, and the eighth surface 48 of the fourth lens 30 covers the first surface 34 of the first lens 24. In such a manner, the first lens 24, the second lens 26, the third lens 28, and the fourth lens 30 can form the rectangular hollow structure shown in FIG. 3 together according to the said arrangement. It should be mentioned that the structure of the lens set 20 is not limited to the said rectangular hollow structure. That is to say, it can also change to an arbitrary quadrangular hollow structure so as to fit mechanical needs. In this circumstance, the structure of the holder 22 corresponding to the lens set 20 also needs to change accordingly so as to encompass and abut the lens set 20 successfully. For example, the lens set 20 can be a parallelogram structure when the first lens 24 is parallel to the third lens 28 and the second lens 26 is parallel to the fourth lens 30. In this circumstance, the holder 22 needs to change to a corresponding parallelogram structure.

Figure 6:
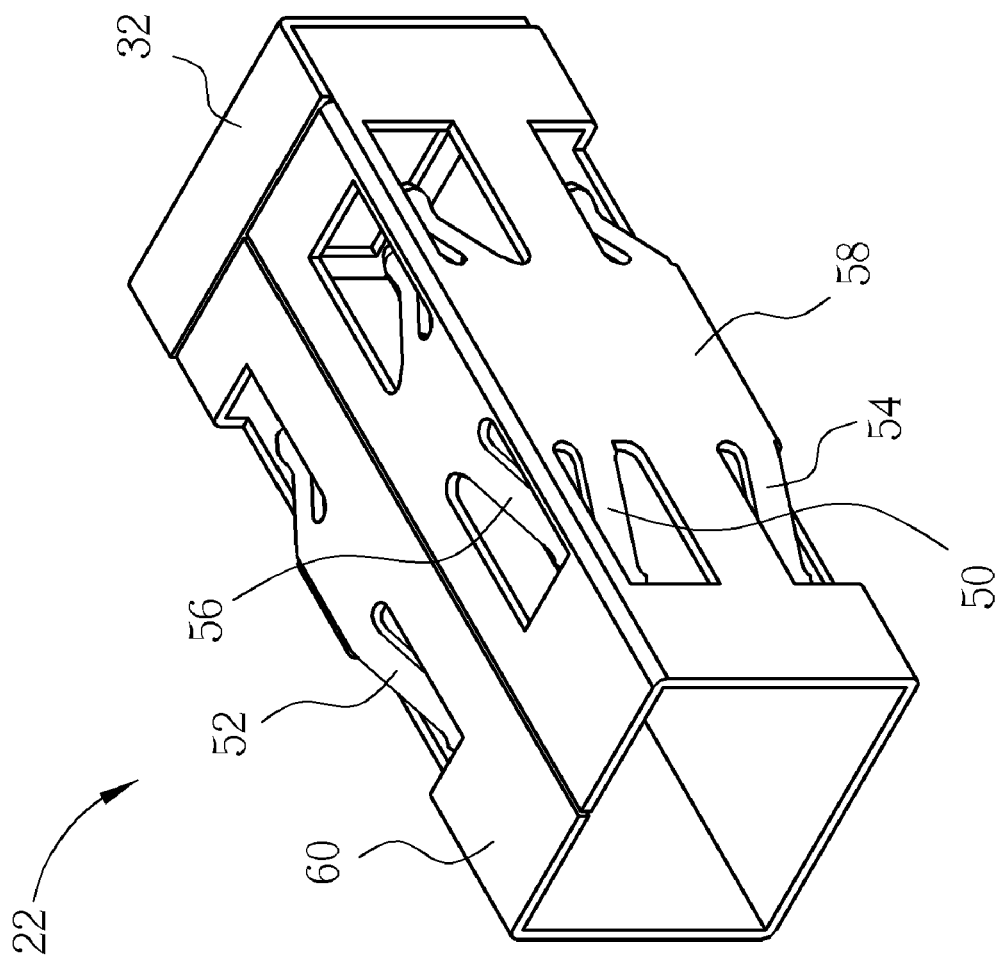
FIG. 6 is a diagram of the holder in FIG. 3.

Next, please refer to FIG. 4 and FIG. 6 at the same time. FIG. 6 is a diagram of the holder 22 in FIG. 3. As shown in FIG. 6, the holder 22 comprises a first flexible structure 50, a second flexible structure 52, a third flexible structure 54, and a fourth flexible structure 56. The first flexible structure 50 is disposed at a first sidepiece 58 of the holder 22, and as shown in FIG. 4, the first lens 24 is sandwiched between the first flexible structure 50 and the second lens 26. The positions that the first flexible structure 50 and the second lens 26 respectively exert on the first lens 24 can be coaxial so as to prevent occurrence of a bending torque on the first lens 24. The second flexible structure 52 is disposed at a second sidepiece 60 of the holder 22, and as shown in FIG. 4, the second lens 26 is sandwiched between the second flexible structure 52 and the third lens 28. The positions that the second flexible structure 52 and the third lens 28 respectively exert on the second lens 26 can be coaxial so as to prevent occurrence of a bending torque on the second lens 26. The third flexible structure 54 is disposed at the first sidepiece 58 of the holder 22, and as shown in FIG. 4, the fourth lens 30 is sandwiched between the third flexible structure 54 and the third lens 28. The positions that the third flexible structure 54 and the third lens 28 respectively exert on the fourth lens 30 can also be coaxial so as to prevent occurrence of a bending torque on the fourth lens 30. The fourth flexible structure 56 is disposed at the second sidepiece 60 of the holder 22, and as shown in FIG. 4, the first lens 24 is sandwiched between the fourth flexible structure 56 and the fourth lens 30. The positions that the fourth flexible structure 56 and the fourth lens 30 respectively exert on the first lens 24 can be coaxial so as to prevent occurrence of a bending torque on the first lens 24. In such a manner, the holder 22 can clamp the lens set 20 steadily through the assembly of the said flexible structures and the said lenses. Furthermore, the number and the shape of the said flexible structures can be changed accordingly based on mechanical needs. For example, except the concave flexible pieces shown in FIG. 6, the flexible structure design can be changed to a structure having a protruding portion protruding toward the inner of the holder for abutting the corresponding lens.

Figure 7:
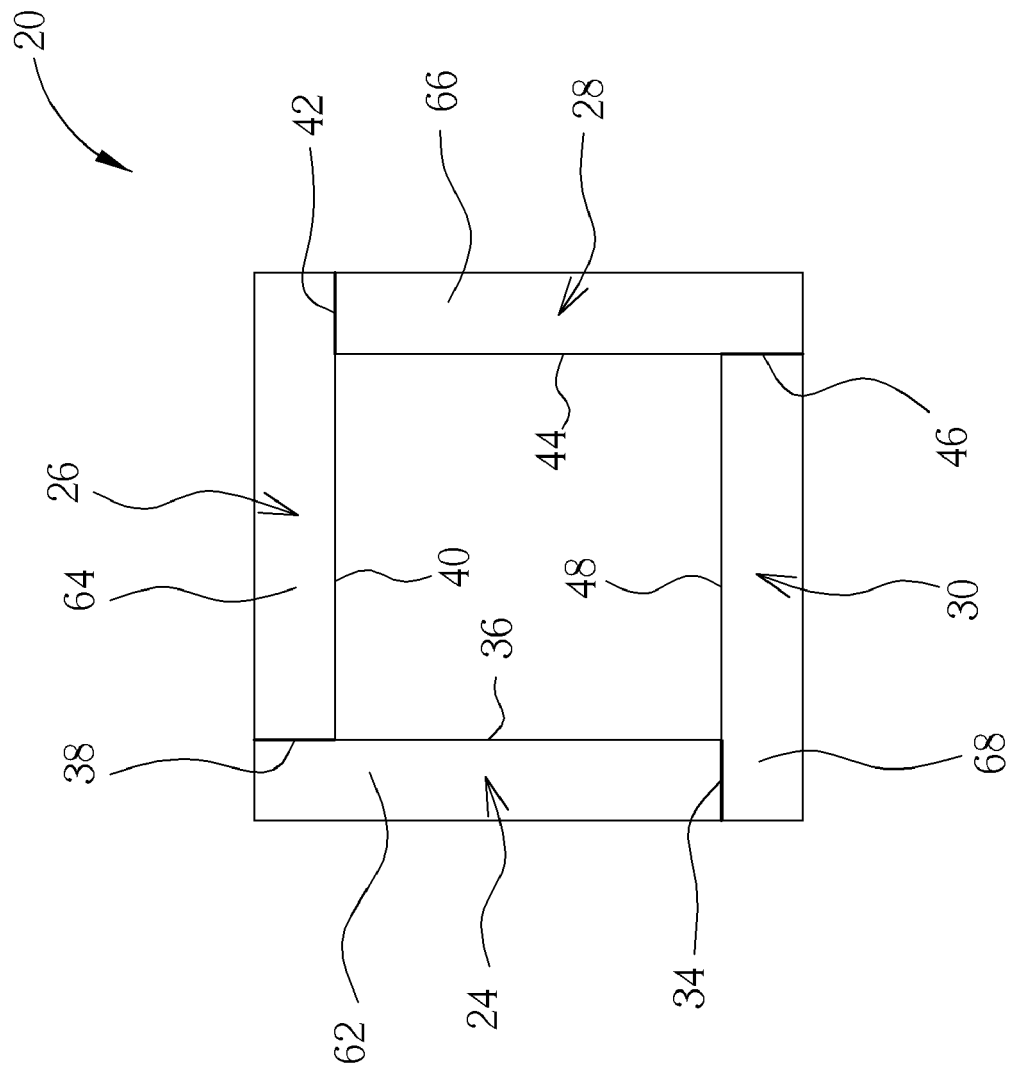
FIG. 7 is a back view of the lens set in FIG. 3.

Finally, there is more detailed description for the lens set 20 and the base 32 provided as follows. Please refer to FIG. 7. FIG. 7 is a back view of the lens set 20 in FIG. 3. As shown in FIG. 7, the first lens 24 further comprises a ninth surface 62 perpendicular to the first surface 34 and the fifth surface 36. The second lens 26 further comprises a tenth surface 64 perpendicular to the second surface 38 and the sixth surface 40. The third lens 28 further comprises an eleventh surface 66 perpendicular to the third surface 42 and the seventh surface 44. The fourth lens 30 further comprises a twelfth surface 68 perpendicular to the fourth surface 46 and the eighth surface 48. And as mentioned above, the lens set 20 leans on the base 32. In other words, the ninth surface 62 of the first lens 24, the tenth surface 64 of the second lens 26, the eleventh surface 66 of the third lens 28, and the twelfth surface 68 of the fourth lens 30 lean on the base 32. Therefore, the holder 22 can encompass and abut the lens set 20 more steadily through the flexible structures abutting against the lens set 20 and the base 32 that the lens set 20 leans on.

Compared to a method for using glue to assemble a light pipe assembly according the prior art, the present invention involves utilizing the specific arrangement of four pieces of lenses in the lens set and the combination of the flexible structures of the holder, the lens set, and the base of the holder to assemble a light pipe assembly with no glue. In such a manner, not only can the collapse of light pipe assembly arose from glue deterioration due to high temperature/ultraviolet environment be avoided, but cost of time, material, and manufacture for assembling a light pipe assembly can also be decreased considerably.

Those skilled in the art will readily observe that numerous modifications and alterations of the device and method may be made while retaining the teachings of the invention.

What is claimed is:

1. A light pipe assembly composed of a plurality of lenses comprising:
    a lens set, comprising:
        a first lens having a first surface and a fifth surface adjacent to the first surface, a first width of the first surface being substantially equal to a first thickness of the first lens;
        a second lens having a second surface and a sixth surface adjacent to the second surface, a second width of the second surface being substantially equal to a second thickness of the second lens, the fifth surface covering the second surface;
        a third lens having a third surface and a seventh surface adjacent to the third surface, a third width of the third surface being substantially equal to a third thickness of the third lens, the sixth surface covering the third surface; and
        a fourth lens having a fourth surface and an eighth surface adjacent to the fourth surface, a fourth width of the fourth surface being substantially equal to a fourth thickness of the fourth lens, the seventh surface covering the fourth surface, the eighth surface covering the first surface; and
    a holder for encompassing and abutting the lens set.

2. The light pipe assembly of claim 1, wherein the first lens, the second lens, the third lens, and the fourth lens form a quadrangular hollow structure.

3. The light pipe assembly of claim 1, wherein the holder comprises a first flexible structure disposed at a first sidepiece of the holder, and the first lens is sandwiched between the first flexible structure and the second lens.

4. The light pipe assembly of claim 1, wherein the holder comprises a second flexible structure disposed at a second sidepiece of the holder, and the second lens is sandwiched between the second flexible structure and the third lens.

5. The light pipe assembly of claim 1, wherein the holder comprises a third flexible structure disposed at a first sidepiece of the holder, and the fourth lens is sandwiched between the third flexible structure and the third lens.

6. The light pipe assembly of claim 1, wherein the holder comprises a fourth flexible structure disposed at a second sidepiece of the holder, and the first lens is sandwiched between the fourth flexible structure and the fourth lens.

7. The light pipe assembly of claim 1, wherein the holder has a base, and the lens set leans on the base.

8. The light pipe assembly of claim 1, wherein the first lens is parallel to the third lens, and the second lens is parallel to the fourth lens.

9. The light pipe assembly of claim 8, wherein the first lens is perpendicular to the second lens.

10. The light pipe assembly of claim 9, wherein the first lens further comprises a ninth surface perpendicular to the first surface and the fifth surface, the second lens further comprises a tenth surface perpendicular to the second surface and the sixth surface, the third lens further comprises an eleventh surface perpendicular to the third surface and the seventh surface, the fourth lens further comprises a twelfth surface perpendicular to the fourth surface and the eighth surface, the holder has a base, and the ninth surface, the tenth surface, the eleventh surface, and the twelfth surface lean on the base.

11. A projector system having light pipe assembly comprising:
    a light source for generating a light beam;
    a light pipe assembly for uniforming and guiding the light beam comprising:
        a lens set, comprising:
            a first lens having a first surface and a fifth surface adjacent to the first surface, a first width of the first surface being substantially equal to a first thickness of the first lens;
            a second lens having a second surface and a sixth surface adjacent to the second surface, a second width of the second surface being substantially equal to a second thickness of the second lens, the fifth surface covering the second surface;
            a third lens having a third surface and a seventh surface adjacent to the third surface, a third width of the third surface being substantially equal to a third thickness of the third lens, the sixth surface covering the third surface; and
            a fourth lens having a fourth surface and an eighth surface adjacent to the fourth surface, a fourth width of the fourth surface being substantially equal to a fourth thickness of the fourth lens, the seventh surface covering the fourth surface, the eighth surface covering the first surface; and
        a holder for encompassing and abutting the lens set;
    an imaging device for processing the light beam uniformed by the light pipe assembly to form an image; and
    a projection lens for receiving the light beam processed by the imaging device and projecting the image.

12. The projector system of claim 11, wherein the first lens, the second lens, the third lens, and the fourth lens form a quadrangular hollow structure.

13. The projector system of claim 11, wherein the holder comprises a first flexible structure disposed at a first sidepiece of the holder, and the first lens is sandwiched between the first flexible structure and the second lens.

14. The projection system of claim 11, wherein the holder comprises a second flexible structure disposed at a second sidepiece of the holder, and the second lens is sandwiched between the second flexible structure and the third lens.

15. The projector system of claim 11, wherein the holder comprises a third flexible structure disposed at a first sidepiece of the holder, and the fourth lens is sandwiched between the third flexible structure and the third lens.

16. The projector system of claim 11, wherein the holder comprises a fourth flexible structure disposed at a second sidepiece of the holder, and the first lens is sandwiched between the fourth flexible structure and the fourth lens.

17. The projector system of claim 11, wherein the holder has a base, and the lens set leans on the base.

18. The projector system of claim 11, wherein the first lens is parallel to the third lens, and the second lens is parallel to the fourth lens.

19. The projector system of claim 18, wherein the first lens is perpendicular to the second lens.

20. The projector system of claim 19, wherein the first lens further comprises a ninth surface perpendicular to the first surface and the fifth surface, the second lens further comprises a tenth surface perpendicular to the second surface and the sixth surface, the third lens further comprises an eleventh surface perpendicular to the third surface and the seventh surface, the fourth lens further comprises a twelfth surface perpendicular to the fourth surface and the eighth surface, the holder has a base, and the ninth surface, the tenth surface, the eleventh surface, and the twelfth surface lean on the base.

* * * * *